(12) United States Patent
Benjestorf

(10) Patent No.: US 12,176,723 B2
(45) Date of Patent: Dec. 24, 2024

(54) NON-METALLIC CONNECTION LIGHT BULB AND SOCKET

(71) Applicant: Non-Metallic Connectors, Inc., Harrisburg, PA (US)

(72) Inventor: Joshua S. Benjestorf, Harrisburg, PA (US)

(73) Assignee: NON-METALLIC CONNECTORS, INC.

( * ) Notice: Subject to any disclaimer, the term of this patent is extended or adjusted under 35 U.S.C. 154(b) by 0 days.

(21) Appl. No.: 18/368,083

(22) Filed: Sep. 14, 2023

(65) Prior Publication Data

US 2024/0146108 A1    May 2, 2024

Related U.S. Application Data

(63) Continuation of application No. 17/875,763, filed on Jul. 28, 2022, now Pat. No. 11,764,610.

(Continued)

(51) Int. Cl.
  *H02J 50/10* (2016.01)
  *F21V 23/06* (2006.01)
  (Continued)

(52) U.S. Cl.
  CPC .............. *H02J 50/10* (2016.02); *F21V 23/06* (2013.01); *H02J 50/05* (2016.02); *F21Y 2115/10* (2016.08)

(58) Field of Classification Search
  CPC ....... H02J 50/10; H02J 50/05; F21Y 2115/10; F21V 23/06; F21K 9/00; F21K 9/235
  See application file for complete search history.

(56) References Cited

U.S. PATENT DOCUMENTS 9,197,292 B2    11/2015  Benjestorf
9,723,699 B1    8/2017   Von Novak, III et al.
(Continued)

FOREIGN PATENT DOCUMENTS

CN    203349050 U    12/2013
GB    2564904 A      1/2019

OTHER PUBLICATIONS

J.S. Benjestorf, X. Liu "Non-mating connector for USB: A quality waterproof connection" Proc. 2013 IEEE Int. Conf. Consumer Electronics pp. 560-563 2013.

(Continued)

*Primary Examiner* — Peggy A Neils
(74) *Attorney, Agent, or Firm* — Panitch Schwarze Belisario & Nadel LLP

(57) ABSTRACT

A light bulb includes one or more LEDs and a housing containing the one or more LEDs. At least a portion of the housing is at least partially transparent to one or more wavelengths of light emitted by the one or more LEDs. A driver is disposed within the housing and electrically connected to the one or more LEDs for driving the one or more LEDs. A non-metallic base is formed at an end of the housing. A contactless electrical power receiver is disposed within the non-metallic base and electrically connected to the driver. The contactless electrical power receiver is configured to contactlessly receive electrical power from an external power source and provide the received electrical power to the driver. A light bulb socket configured for contactless power transfer to the light bulb is also provided herein.

6 Claims, 7 Drawing Sheets

Related U.S. Application Data

(60) Provisional application No. 63/229,830, filed on Aug. 5, 2021.

(51) Int. Cl.
  *F21Y 115/10*   (2016.01)
  *H02J 50/05*   (2016.01)

(56) References Cited

U.S. PATENT DOCUMENTS

| | | |
|---|---|---|
| 10,029,611 B2 * | 7/2018 | Harris .................. F21S 9/02 |
| 2007/0159422 A1 | 7/2007 | Blandino et al. |
| 2007/0205730 A1 | 9/2007 | Baarman |
| 2011/0292651 A1 | 12/2011 | Kovacik et al. |
| 2012/0243235 A1 | 9/2012 | Gao |
| 2013/0063937 A1 | 3/2013 | Ahn et al. |
| 2014/0049963 A1 | 2/2014 | McGuire et al. |
| 2015/0009671 A1 | 1/2015 | Flaherty et al. |
| 2015/0334794 A1 | 11/2015 | Chou et al. |
| 2019/0017659 A1 | 1/2019 | Dendorfer et al. |

OTHER PUBLICATIONS

Benjestorf, Joshua S, "A New Trend in Connectivity: Sharing Content Over Multiple Channels," in IEEE Consumer Electronics Magazine, vol. 3, Issue 1, pp. 25-31, Jan. 2014.

J.S. Benjestorf, A. Morales, S. Agili, "Design and Analysis of Wireless Power Transfer for Non-Metallic USB Connector" Proc. 2020 IEEE Int. Conf. Consumer Electronics, ISBN 978-1-7281-5186-1, 2020.

International Search Report and Written Opinion issued Oct. 31, 2022 in International Application No. PCT/US2022/038821.

* cited by examiner

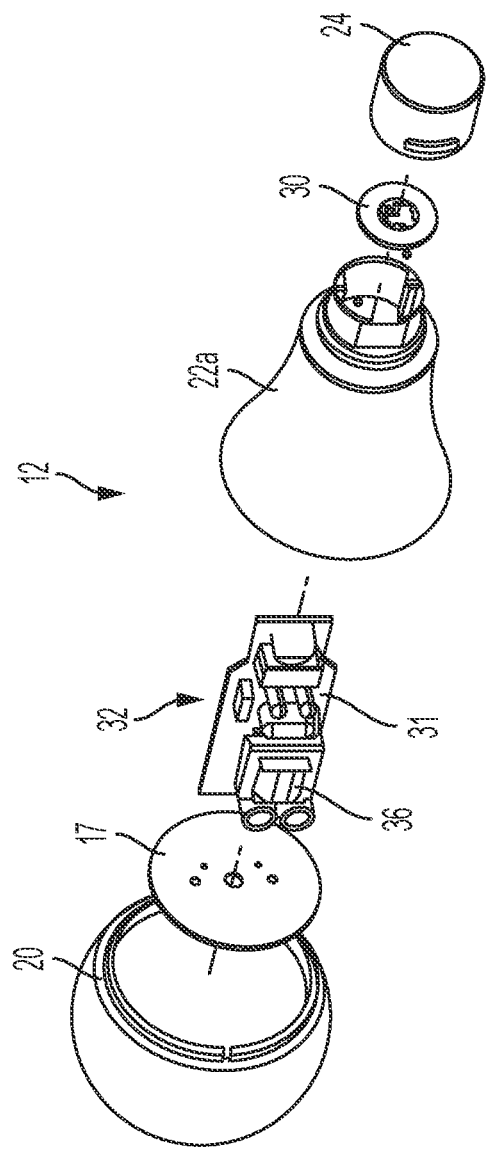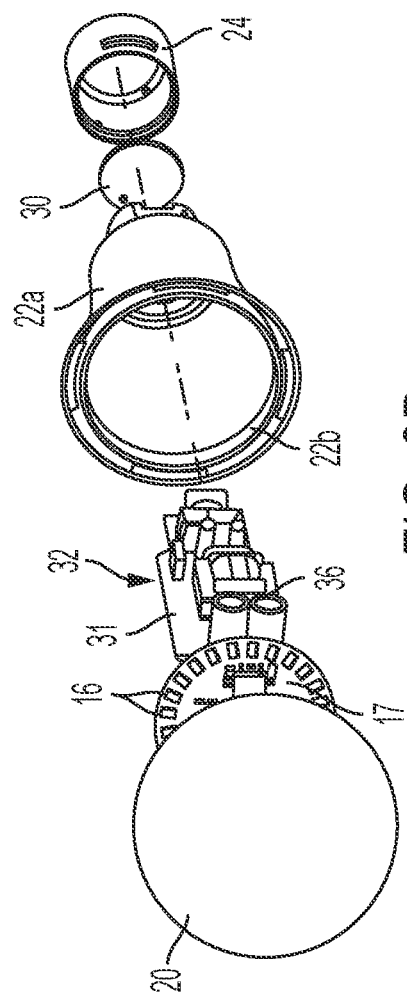

NON-METALLIC CONNECTION LIGHT BULB AND SOCKET

CROSS-REFERENCE TO RELATED APPLICATIONS

This application is a continuation of U.S. patent application Ser. No. 17/875,763, filed on Jul. 28, 2022, entitled "Non-Metallic Connection Light Bulb and Socket", currently pending, which claims the benefit of U.S. Provisional Patent Application No. 63/229,830, filed on Aug. 5, 2021, entitled "Non-Metallic Connection Light Bulb and Socket," now expired, the entire contents of all of which are incorporated by reference herein.

BACKGROUND

Embodiments described herein relate generally to a lamp assembly including a light bulb and a light bulb socket, and more particularly, to a light bulb and light bulb socket that lack metal electrical power contacts and, when the light bulb is received in the socket, allow for contactless power transfer from the light bulb socket to the light bulb.

A conventional light bulb typically includes two exposed metal contacts—a foot contact on the bottom of the light bulb and a screw thread contact. The two contacts are connected to wires within the bulb that can be attached to a filament, or more recently, to a driver circuit for powering one or more light emitting diodes (LEDs). When the light bulb is placed in a correctly sized light bulb socket, such as by mating the screw thread contact with a mating thread of the light bulb socket, the two bulb contacts make physical and electrical connection with respective exposed electrical contacts in the light bulb socket. If the light bulb socket is connected to an electrical power source, e.g., an electrical outlet or a battery, an electrical circuit can be completed between the light bulb and the light bulb socket and the light bulb can be illuminated.

However, this arrangement can present a number of difficulties. First and foremost is the danger of having exposed electrical contacts, particularly in the light bulb socket. While typical sockets are designed to minimize the risk of accidental electrocution through physical touching of the contacts, the possibility still exists and can be heightened through damage to the socket, the use of metal instruments or the like around an exposed socket, submersion in water, or the like. Corrosion is another potential problem for conventional lamp assemblies. The metal contacts can be exposed to ambient air. In some environments, this can lead to corrosion or other degradation of the contacts, causing safety concerns similar to those described above or, at the very least, poor electrical connection affecting operation. Still further, there can occasionally be a need for light under water or other fluids, necessarily requiring a specialized lamp design, which can be expensive.

Recent advances have been made in contactless power transmission, such as for waterproofing consumer electronics. For example, U.S. Pat. No. 9,197,292, the entire contents of which are incorporated by reference herein, and which was filed by the inventor of the present application, illustrates some techniques for contactlessly transmitting power over a connector using capacitive or inductive coupling.

It is therefore desired to provide a light bulb and light bulb socket that avoid the need for exposed metallic electrical contacts. It is desired that lamp assemblies utilizing the light bulb and light bulb socket can be available for use in many different kinds of environmental settings, including potentially under water in some embodiments. It is further desired that, in some embodiments, conventional lamp assemblies can be retrofit for operation with the above-mentioned light bulb and light bulb socket.

BRIEF SUMMARY

Briefly stated, one embodiment comprises a light bulb including one or more LEDs and a housing containing the one or more LEDs. At least a portion of the housing is at least partially transparent to one or more wavelengths of light emitted by the one or more LEDs. A driver is disposed within the housing and electrically connected to the one or more LEDs for driving the one or more LEDs. A non-metallic base is formed at an end of the housing. A contactless electrical power receiver is disposed within the non-metallic base and electrically connected to the driver. The contactless electrical power receiver is configured to contactlessly receive electrical power from an external power source and provide the received electrical power to the driver.

In one aspect, the non-metallic base includes an end plate and a cylindrical sidewall extending therefrom. The contactless electrical power receiver is disposed adjacent to the end plate. In another aspect the light bulb further includes at least one magnet disposed in the cylindrical sidewall. In another aspect, the non-metallic base includes one or more mating ribs protruding from the cylindrical sidewall.

In another aspect, the driver includes a rectifier and a power converter.

In another aspect, the contactless electrical power receiver is a receiving inductor coil.

Another embodiment comprises a light bulb socket including a housing having an opening formed therein and a light power supply disposed within the housing. The light power supply includes a supply input configured to electrically connect to an external power supply via the opening in the housing. A recess is formed on the housing and is free of metallic material. A contactless electrical power transmitter is disposed within the housing and adjacent to the recess. The contactless electrical power transmitter is electrically connected to the light power supply and is configured to contactlessly transmit electrical power to a light bulb received in the recess.

In one aspect, the recess is surrounded by a cylindrical sidewall. In another aspect, the light bulb socket further includes at least one magnet disposed in the cylindrical sidewall. In another aspect, the cylindrical sidewall includes one or more mating slots formed therein.

In another aspect, the housing includes a first housing portion and a second housing portion. The first housing portion includes the opening, the second housing portion includes the recess, and the first and second housing portions are connected to one another to form an inner cavity of the housing. The inner cavity is accessible through the opening and is isolated from the recess. The light power supply and the contactless electrical power transmitter are disposed within the inner cavity.

In another aspect, the light power supply includes a power converter.

In another aspect, the opening includes a threaded coupler.

In another aspect, the contactless electrical power transmitter is a transmitting inductor coil.

Yet another embodiment comprises a lamp assembly including a light bulb and a light bulb housing. The light bulb includes one or more LEDs and a housing containing the one or more LEDs. At least a portion of the housing is at least partially transparent to one or more wavelengths of light emitted by the one or more LEDs. The light bulb further includes a driver disposed within the housing and electrically connected to the one or more LEDs for driving the one or more LEDs, a non-metallic base formed at an end of the housing, and a contactless electrical power receiver disposed within the non-metallic base and electrically connected to the driver. The light bulb socket includes a housing having an opening formed therein and a light power supply disposed within the housing. The light power supply includes a supply input configured to electrically connect to an external power supply via the opening in the housing. The light bulb socket further includes a recess formed on the housing that is free of metallic material and a contactless electrical power transmitter disposed within the housing and adjacent to the recess. The contactless electrical power transmitter is electrically connected to the light power supply. When the base of the light bulb is received in the recess of the light bulb socket, the contactless electrical power receiver and the contactless electrical power transmitter are aligned and physically separated from one another such that the contactless electrical power transmitter is enabled to contactlessly transmit electrical power from the light power supply to the contactless electrical power receiver. The contactless electrical power receiver is configured to provide the received electrical power to the driver.

In one aspect, the non-metallic base includes an end plate and a cylindrical sidewall extending therefrom. The contactless electrical power receiver is disposed adjacent to the end plate, and the recess is surrounded by a cylindrical sidewall. In another aspect, the lamp assembly further includes a first magnet disposed in the cylindrical sidewall of the non-metallic base and a second magnet disposed in the cylindrical sidewall of the recess. The first magnet is configured to align with the second magnet to retain the light bulb in the light bulb socket. In another aspect, the non-metallic base includes a mating rib protruding from the cylindrical sidewall of the non-metallic base and the recess includes a mating slot formed in the cylindrical sidewall of the recess. The mating rib is configured to be received in the mating slot to retain the light bulb in the light bulb socket.

In another aspect, the contactless electrical power receiver is a receiving inductor coil and the contactless electrical power transmitter is a transmitting inductor coil.

BRIEF DESCRIPTION OF THE SEVERAL VIEWS OF THE DRAWINGS

The following detailed description of preferred embodiments will be better understood when read in conjunction with the appended drawings. For the purpose of illustration, there are shown in the drawings embodiments which are presently preferred. It should be understood, however, that the invention is not limited to the precise arrangements and instrumentalities shown.

In the drawings:

FIG. 3A is a bottom side perspective exploded view of the light bulb of FIG. 1;

FIG. 3B is a top side perspective exploded view of the light bulb of FIG. 1;

DETAILED DESCRIPTION

Figure 1:
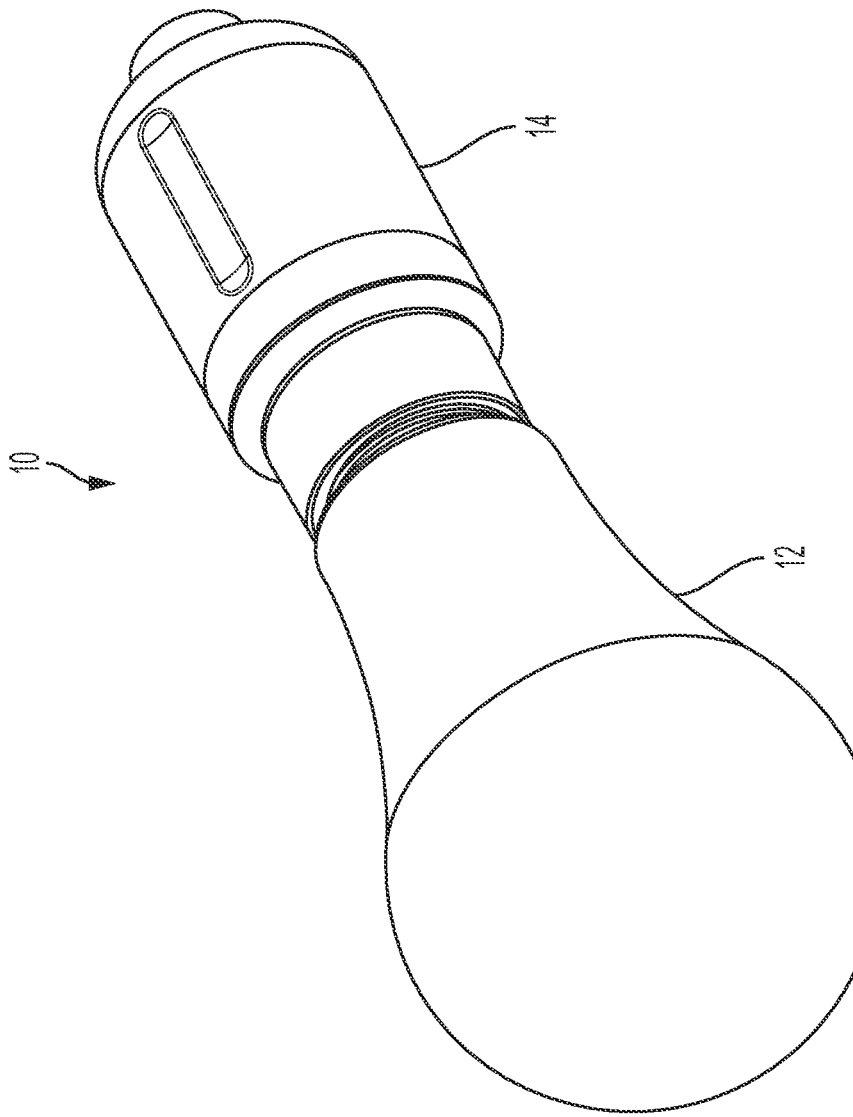
FIG. 1 is a top side perspective view of a lamp assembly including a light bulb and a light bulb socket in accordance with an example embodiment of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

It should also be understood that the terms "about," "approximately," "generally," "substantially" and like terms, used herein when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIG. 1, there is shown an example of a lamp assembly 10 that includes a light bulb 12 and a light bulb socket 14. In FIG. 1, the light bulb 12 is shown in an installed configuration within the light bulb socket 14, as will be explained in further detail below.

Figure 2:
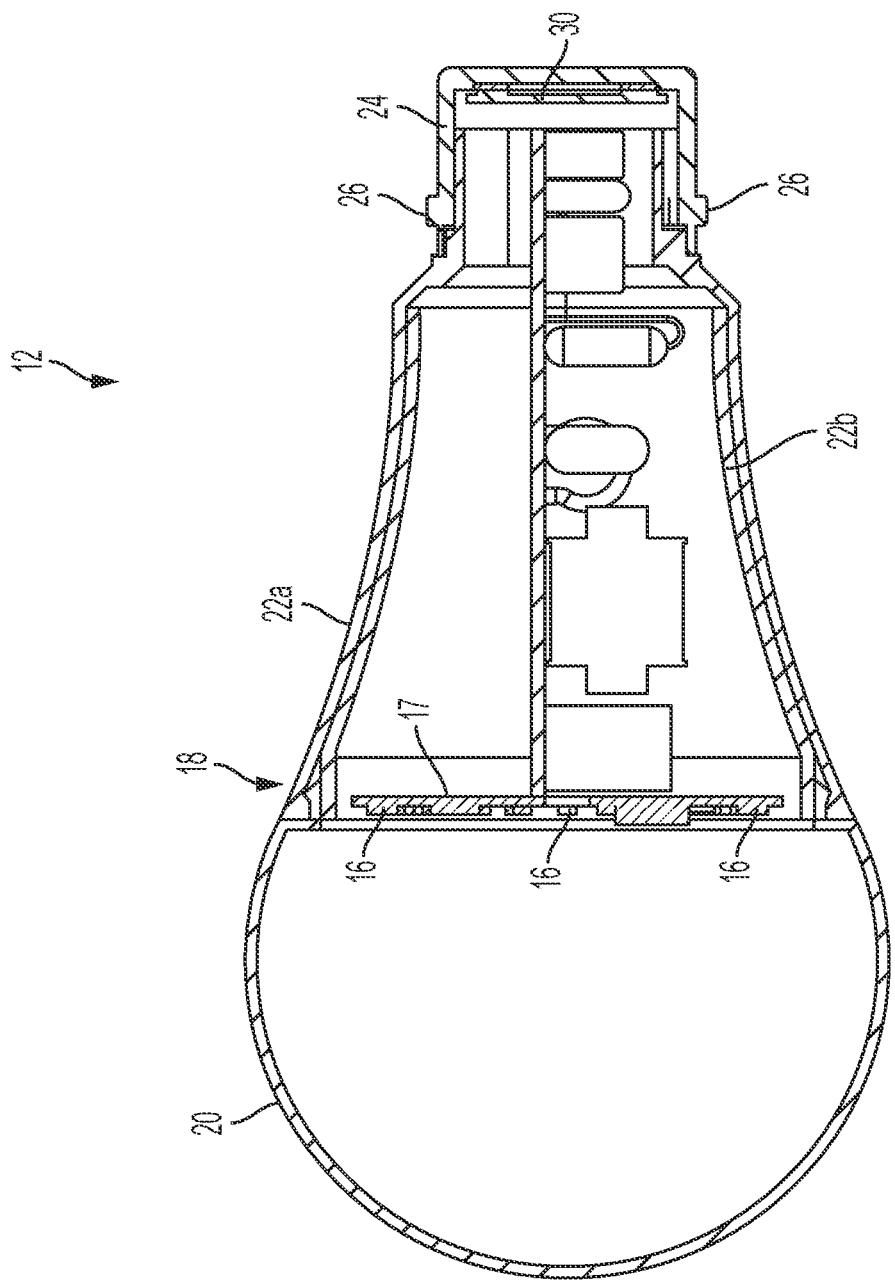
FIG. 2 is a side elevational cross-sectional view of the light bulb of FIG. 1.

Referring to FIGS. 2 and 3A-3B, the light bulb 12 includes one or more LEDs 16. Each LED 16 may emit light at one or more wavelengths that may be selected based on the application desired for the particular light bulb 12. For example, a light bulb 12 for a standard ambient light lamp may include LEDs 16 emitting a form of white light and/or groups of LEDs 16 of varying colors that combine to create white light. LEDs 16 in an array may therefore all be of the same color, or different colors. Other applications may require red, blue, amber, green, or other colors of light. In some embodiments, the light bulb 12 may be configured to allow only certain LEDs 16 in the array to be activated at one time, for example, where the light bulb 12 can be used for alternating color illumination (e.g., rotating between blue, red, and green or the like). The LED(s) 16 may be arranged on an LED board 17, although other configurations for mounting LEDs may be used as well.

The light bulb 12 also includes a housing 18 that contains the one or more LEDs 16. At least a portion of the housing 18 is at least partially transparent to one or more wavelengths of light emitted by the one or more LEDs 16. For example, the housing 18 in FIGS. 2 and 3 may include a diffuser 20 that is positioned in the path of light emitted by the LEDs 16. While a diffuser 20 is shown, the housing 18 may alternatively utilize clear or semi-opaque glass or plastic in the light path. Moreover, the diffuser 20 or other structure permitting the passage of light from the LEDs 16 may be mechanically connected to (e.g., by snap-fit, adhesive, fasteners, welding, or the like) the remainder of the housing 18 or may be integrally formed with the housing 18.

In FIGS. 2-3B, a portion of the housing 18 may include one or more components functioning as a heat sink. In this example, the housing 18 may include an outer shell 22a connected to the diffuser 20 and an inner shell 22b in contact with and surrounded by the outer shell 22a. The outer and inner shells 22a, 22b may be made from plastic, ceramic, combinations thereof, or other like thermally conducting materials capable of leading heat generated by the LEDs 16 and other components located within the housing 18 to ambient air or other lower temperature conduits. While outer and inner shells 22a, 22b are shown in the drawings, a single structure or additional multiple structures may be used to provide heat sink capabilities. Heat sinks may take other forms as well.

The light bulb 12 may also include a non-metallic base 24 formed at the end of the housing 18. The base 24 may effectively replace the screw thread and bottom contacts on a conventional light bulb. The base 24 in FIGS. 2 and 3 is shown as a generally cylindrically shaped cap that is fitted onto an end of the outer shell 22 of the housing 18. However, the base 24 may be secured to alternative portions of the housing 18 or formed as an integral portion of the housing 18. The base 24 may be made from plastic, although other non-metallic, electrically insulative materials may be used as well.

Figure 4:
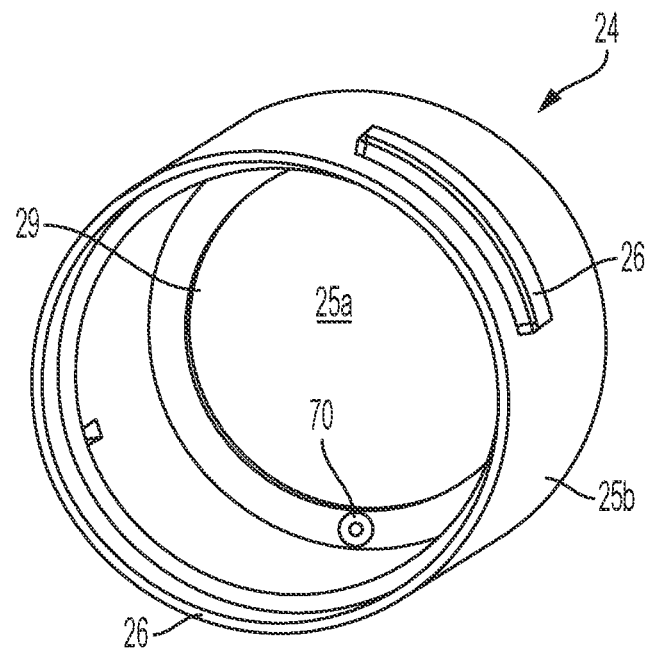
FIG. 4 is a top side perspective view of a base for the light bulb of FIG. 1.
Figure 5:
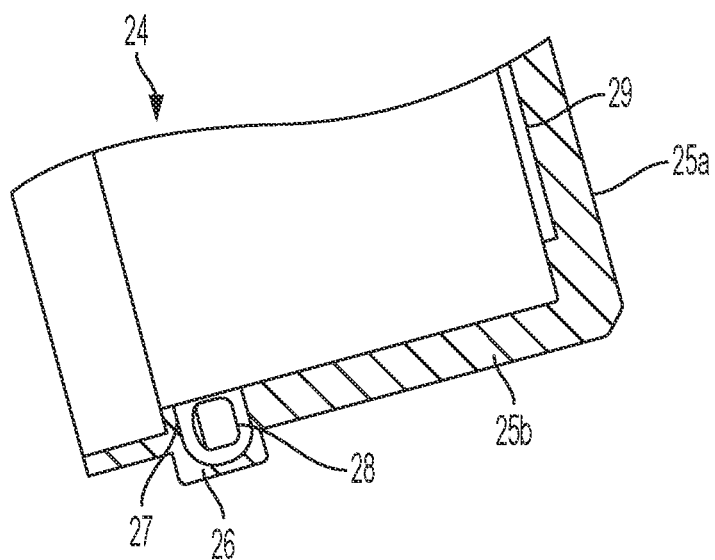
FIG. 5 is an enlarged side cross-sectional view of a portion of the base of FIG. 4.

An example of the base 24 is shown further in FIGS. 4 and 5. The base 24 may include an end plate 25a and a cylindrical sidewall 25b extending therefrom, although other shapes and configurations may be used as well, which may be influenced by spacing requirements, socket shape, or other like considerations. In this example, to secure the light bulb 12 to the socket 14, the base 24 may include one or more mating ribs 26 that protrude out from the cylindrical sidewall 25b. In FIG. 4, the base 24 includes two mating ribs 26 located on opposite one another on an outer surface of the cylindrical sidewall 25b, with each extending along a portion of the circumference of the cylindrical sidewall 25b. However, more or fewer mating ribs 26 may be provided, and the mating ribs 26 may have different shapes, orientations, and/or configurations. In addition to or in place of the mating rib(s) 26, at least one magnet 28 may be disposed in the cylindrical sidewall 25b of the base 24. As shown in FIG. 5, the cylindrical sidewall 25b may include one or more pockets 27 to accommodate each of the magnets 28 provided. In this example, the pocket 27 also partially extends into one of the mating ribs 26. As an alternative, one or more magnets 28 may be molded into a material of the base 24 rather than having pockets formed in the cylindrical sidewall 25b. As will be explained in further detail below, the rib(s) 26 and/or magnet(s) 28 may be used to secure the light bulb 12 in the light bulb socket 14. However, in other embodiments, the base 24 may include a screw thread (not shown) or other type of mechanical fastening structure for securing the light bulb 12 to the light bulb socket 14.

Referring back to FIGS. 2-3B, the light bulb 12 may further include a contactless electrical power receiver 30 disposed within the housing 18 thereof, and more particularly, in the non-metallic base 24. In some embodiments, the contactless electrical power receiver 30 is disposed adjacent to the end plate 25a of the base 24. For example, as shown in FIGS. 4 and 5, the end plate 25a may include a recessed portion 29 shaped and configured to receive the contactless electrical power receiver 30. However, the contactless electrical power receiver 30, or portions thereof, may be disposed anywhere in the base 24 as necessary to meet particular sizing or shape needs and to facilitate the contactless receipt of electrical power, as will be explained further below. The contactless electrical power receiver 30 may be secured to the end plate 25a, other portions of the base 24, and/or other components of the housing 18 through friction fit, mechanical fasteners, adhesives, or the like. In the embodiment shown, the contactless electrical power receiver 30 is a receiving inductor coil, such as part number 760308105214 available from WURTH ELEKTRONIK. Additionally or alternatively, other types and styles of inductor coils may be used as well. Still further, the contactless electrical power receiver 30 may instead comprise a capacitive plate, a combination of an inductor coil and a capacitive plate, or the like.

The contactless electrical power receiver 30 may be electrically connected to a driver 32 that is disposed within the housing 18 and electrically connected to the LED(s) 16 for driving the same. The contactless electrical power receiver 30 may make electrical connection to the driver 32 via electrical leads (not shown). The driver 32 may include a printed circuit board 31 that may be mechanically or adhesively secured to the housing 18 of the light bulb 12. The driver 32 may include electronic components for receiving electrical power from the contactless electrical power receiver 30 and making necessary adjustments for application of that electrical power to the LED(s) 16. For example, the driver may include a rectifier (not shown) for converting an AC electrical signal received by the contactless electrical power receiver 30 into a DC electrical signal. However, if the AC electrical signal is at a sufficiently high frequency (such as in the kHz range or higher), light oscillation of the LED(s) 16 may provide light output that is visually indistinguishable from that provided by a DC electrical signal, allowing the rectifier to be omitted. The driver 32 may further include a power converter 36 for stepping a voltage of the electrical signal to a level appropriate for powering the LED(s) 16. The voltage level may depend on the intended wattage output of the light bulb 12, and may, in some circumstances, be switchable for light bulbs 12 having multiple output settings (e.g., a three-way bulb or the like). The driver 32 may also include any other electronics that are necessary for modifying, storing, and/or delivering electrical energy necessary for driving the LED(s) 16 or other electronic components needed to operate the light bulb 12. In FIGS. 2-3B, the LEDs 16 are shown mounted on a board 17 separate from the printed circuit board 31 of the driver 32. However, one or more of the LEDs 16 may be mounted on the same printed circuit board 31 as the driver 32 in some embodiments. Moreover, various components of the driver 32 may be distributed among multiple boards rather than being confined to a single printed circuit board 31.

Figure 6:
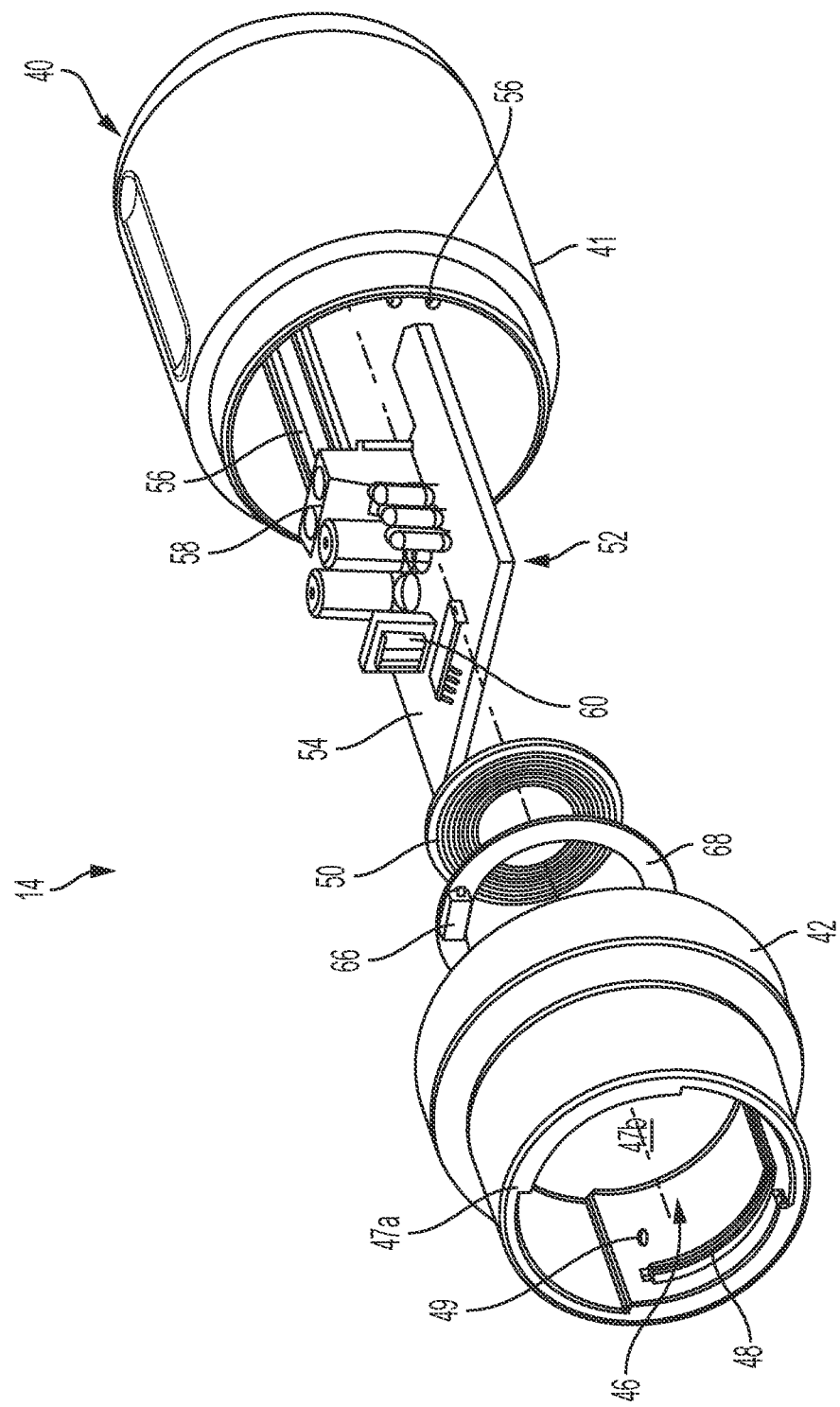
FIG. 6 is a top side perspective exploded view of the light bulb socket of FIG. 1.
Figure 7:
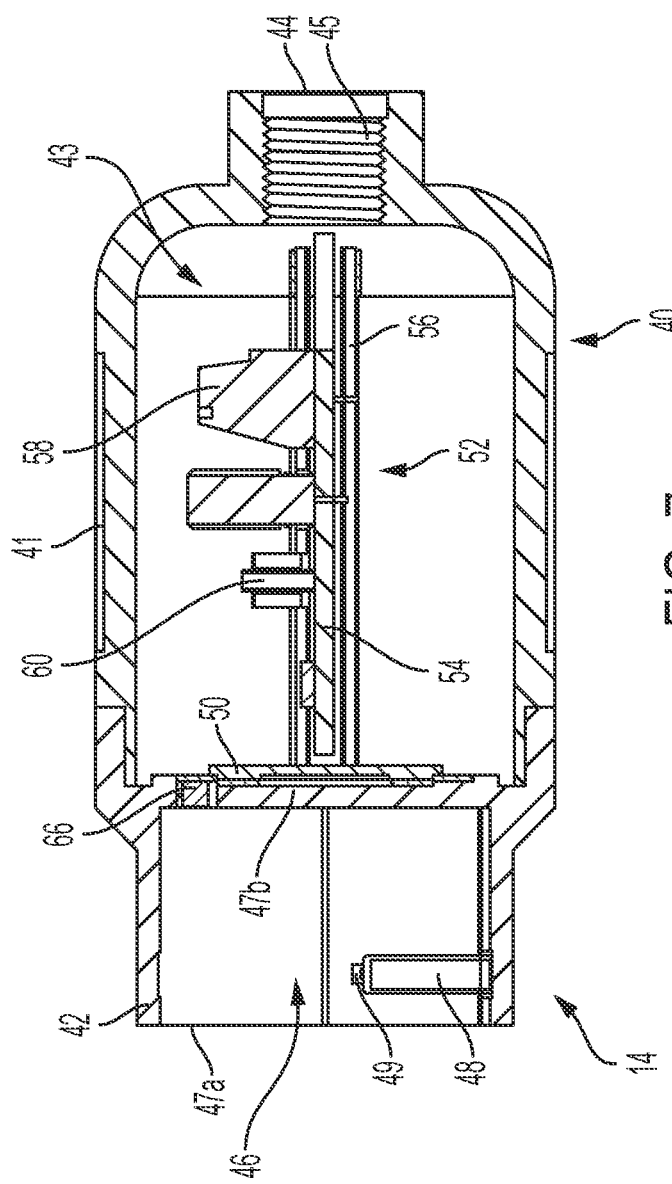
FIG. 7 is a side elevational cross-sectional view of the light bulb socket of FIG. 1.

Referring now to FIGS. 6-7, the light bulb socket 14 may include a housing 40. In the example shown in the drawings, the housing 40 is made from a first, lower housing portion 41 that is connected to a second, upper housing portion 42. However, the housing 40 may be formed by a unitary structure or can be divided among any number of desired portions that can be attached together. The lower and upper housing portions 41, 42 may be press fit together at mating ends thereof and supplemented with adhesive. However, other methods of attaching the lower and upper housing portions 41, 42 to one another can be used as well, such as using mechanical fasteners, screw threads, welding, combinations thereof, or the like.

The housing 40 may include an opening 44 formed therein. In this case, the opening 44 is provided on an end of the lower housing portion 41 opposite to the mating end for the upper housing portion 42. The opening 44 may allow access to an inner cavity 43 of the housing 40, which will be explained in further detail below. In some embodiments, the opening 44 may include a screw thread 45 to allow for connection to a lamp or other support (not shown). For example, in the embodiment shown in FIGS. 6-7, the screw thread 45 may have a standard screw pitch to allow the light bulb socket 14 to attach to common lamps as a conventional socket replacement. However, other methods for attaching the light bulb socket 14 to a lamp or other support may be used as well. In some instances, a light bulb socket 14 may be integrally formed with a lamp body or the like.

A recess 46 may be formed on the housing 40 of the light bulb socket 14, which is configured to receive the light bulb 12 in the installed configuration (FIG. 1). In the example shown in FIGS. 6-7, the recess 46 is formed at an end of the upper housing portion 42 opposite to the opening 44 in the lower housing portion 41. However, the recess 46 may be formed anywhere on the housing 40 to account for space, orientation, and/or other design requirements.

The recess 46 may be surrounded by a generally cylindrical sidewall 47a and terminate in a closed end surface 47b. While the recess 46 is shown integrally formed as part of the upper housing portion 42 or otherwise a portion of the overall housing 40, the recess 46 may alternatively be attached to the housing 40 via mechanical fasteners, adhesives, threading, welding, combinations thereof, or the like. Notably, the recess 46 may be free of metallic material to avoid the presence of exposed metallic contacts as exist in conventional lamp assemblies. For example, the sidewalls 47a and closed end surface 47b of the recess 46 may be made from plastic or other types of non-metallic, electrically insulative material. As explained earlier, the base 24 to be received in the recess 46 is non-metallic, so there is no need for metal components within the recess 46.

In this example, to secure the light bulb 12 to the socket 14, the recess 46 may include one or more mating slots 48 that are formed in the cylindrical sidewall 47a thereof. In FIG. 7, the recess 46 includes two mating slots 48 located opposite one another on an interior of the cylindrical sidewall 47a, with each extending along a portion of the circumference of the cylindrical sidewall 47a. The mating slots 48 also include axially extending portions to allow receipt of the mating ribs 26 of the light bulb 12 prior to rotation of the light bulb 12 within the recess 46. However, more or fewer mating slots 48 may be provided, and the mating slots 48 may have different shapes, orientations, and/or configurations. In addition to or in place of the mating slot(s) 48, at least one magnet 49 may be disposed in the cylindrical sidewall 47a of the recess 46. As shown in the example of FIGS. 6-7, a magnet 49 may be embedded in the cylindrical sidewall 47a adjacent an end of each mating slot 48.

To install the light bulb 12 in the light bulb socket 14 in this example, as shown in FIG. 1, the base 24 may be inserted into the recess 46 with the mating ribs 26 aligned with the axially extending portions of the mating slots 48. Upon reaching the end of its axial travel within the recess 46, the light bulb 12 may then be rotated clockwise by approximately 45° with the mating ribs 26 traversing the circumferentially extending portions of the mating slots 48. At the end of the rotation, the magnet 28 in each mating rib 26 aligns with the respective magnet 49 associated with each mating slot 48. In this example, the mating of the ribs 26 and slots 48 combined with the alignment of the magnets 28, 49 mechanically holds the light bulb 12 in the light bulb socket 14. Of course, the attachment may be made in other ways depending on the shapes and configurations of the mating ribs 26, the mating slots 48, and the alignment magnets 28, 49. In other embodiments, the recess 46 may include a screw thread (not shown) or other type of mechanical fastening structure for securing the light bulb 12 to the light bulb socket 14.

Figure 8:
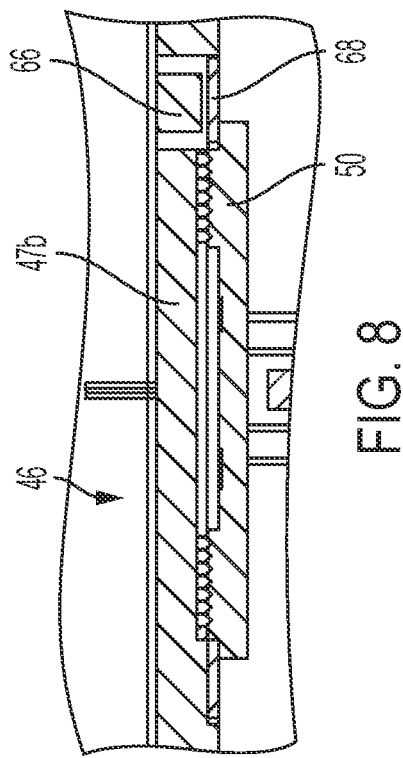
FIG. 8 is an enlarged side elevational cross-sectional view of a portion of the light bulb socket from FIG. 7.

A contactless electrical power transmitter 50 may be disposed within the housing 40 of the light bulb socket 14, and more particularly, adjacent to the recess 46. In some embodiments, the contactless electrical power transmitter 50 is disposed adjacent to the closed end surface 47b of the recess 46. For example, as shown in FIG. 8, the contactless electrical power transmitter 50 may abut the closed end surface 47b on a side opposite to the recess 46. However, the contactless electrical power transmitter 50, or portions thereof, may be disposed anywhere in the housing 40 as necessary to meet particular sizing or shape needs and to facilitate the contactless transmission of electrical power. The contactless electrical power transmitter 50 may be directly or indirectly secured to the closed end surface 47b on a side opposite to the recess and/or other components of the housing 40 through friction fit, mechanical fasteners, adhesives, or the like. In the embodiment shown, the contactless electrical power transmitter 50 is a transmitting inductor coil of the same make and model as the contactless electrical power receiver 30 (e.g., part number 760308105214 available from WURTH ELEKTRONIK). However, the contactless electrical power transmitter 50 may be of a different make and/or model as well. Additionally or alternatively, other types and styles of inductor coils may be used. Still further, the contactless electrical power transmitter 50 may instead comprise a capacitive plate, a combination of an inductor coil and a capacitive plate, or the like.

A light power supply 52 may be disposed within the housing 40. In the embodiment shown in the drawings, the light power supply 52 is mounted within the inner cavity 43 along with the contactless electrical power transmitter 50. The inner cavity 43 may be formed by a hollow interior of the lower housing portion 41 and may be closed at one end by the closed end surface 47b from the upper housing portion 42. The inner cavity 43 may be isolated from the recess 46 to prevent inadvertent physical contact with the light power supply 52, contactless electrical power transmitter 50, or other components via the recess 46. However, the cavity 43 may be formed in any manner consistent with the configuration and assembly of the housing 40.

The light power supply 52 may be arranged on a printed circuit board 54 that may be secured to the housing 40, such as the lower housing portion 41. For example, as shown in the figures, the lower housing portion 41 may include a pair of mounting tracks 56 sized and positioned to receive edges of the printed circuit board 54 of the light power supply 52. Of course, other methods for mounting the printed circuit board 54, such as mechanical fasteners, adhesives, welding, combinations thereof, or the like may be used as well. In addition, components of the light power supply 52 need not be confined to a single printed circuit board 54 but may instead be disposed among multiple boards, directly formed or mounted to the housing 40, or the like.

The light power supply 52 may include a supply input 58 that is configured to electrically connect to an external power supply (not shown) via the opening 44 in the housing 40. The external power supply may be a power cable or cord with a plug for insertion into a power outlet or other mains power supply source (not shown). The power cable may be fed through the opening 44 of the housing 40, similar to conventional lamp sockets. However, other external power supplies may be provided in the alternative, which themselves generate or receive AC or DC electrical signals that may be transferred to the light power supply 52 via the supply input 58. In the example shown in the drawings, the supply input 58 may be a terminal block with screws, clamps, or other fasteners (not shown) for retaining exposed wire ends (not shown) from the external power supply. However, the supply input 58 may take other forms as well, such as wiring, a harness, battery slots, or the like. In the example in the drawings, a power cord for plugging into a wall outlet may include exposed wire ends received by the terminal block 58. The light power supply 52 may further include other electronic components for conditioning the received electrical signal. For example, the light power supply 52 may include a power converter 60 for changing the voltage level of the received electrical signal. If the external power supply receives mains power at 120 or 240 VAC, the power converter 60 of the light power supply 52 may step that voltage down to, for example, 5 VAC for operating the light bulb 12, although other voltage levels can be used depending on the required operating conditions. Other components may be used as well, such as a frequency converter (not shown). Using a mains supply as the example again, it may be desirable to have the contactless electrical power transmitter 50 operate at a frequency different from the 50 or 60 Hz supplied by the external power supply. The contactless electrical power transmitter 50 is electrically connected to the light power supply 52 and receives the electrical signal after it has been properly conditioned.

In some embodiments, it may be beneficial to provide a seal (not shown) at the opening 44 of the housing 40. For example, in an underwater lamp assembly, a seal may be used to prevent ingress of water into the housing 40 through the opening 44 when the housing 40 is submerged and the supply cord is extending therethrough. The housing 40 may also be designed to have an interior seal in place of or supplementing a seal directly at the opening 44.

Figure 9:
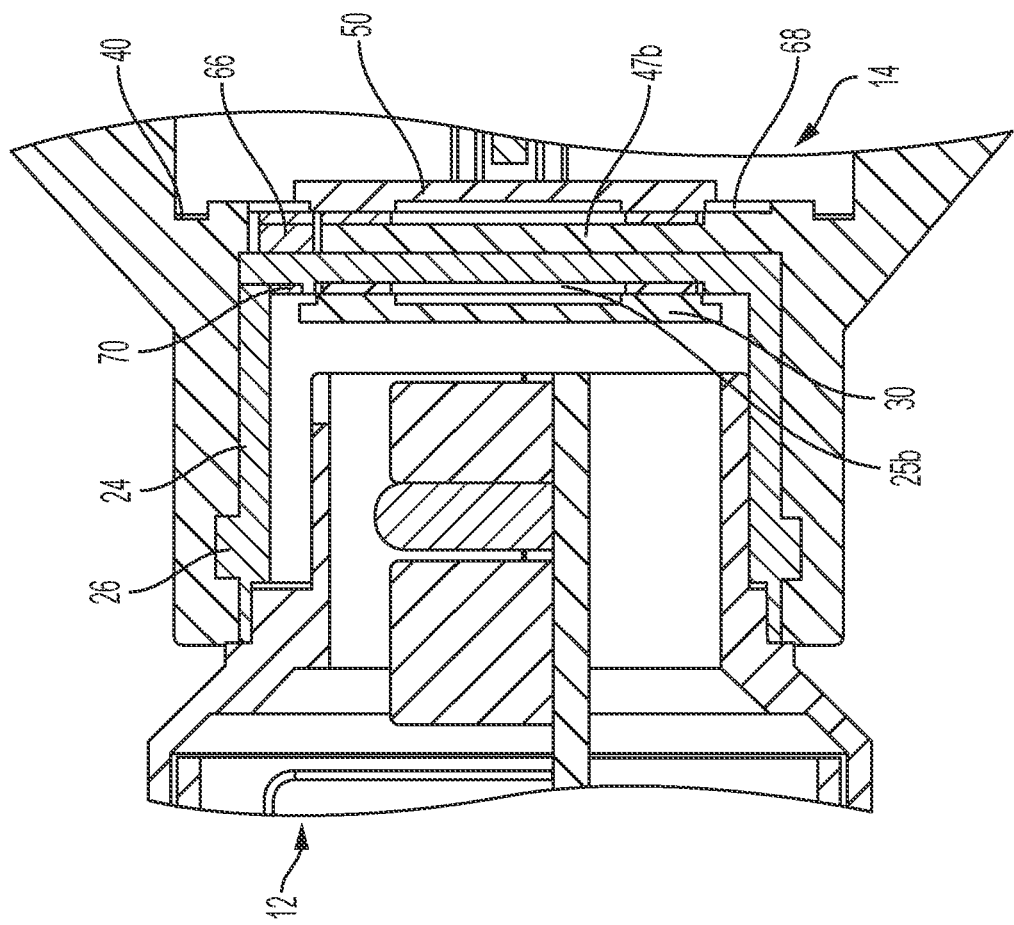
FIG. 9 is an enlarged side elevational cross-sectional view of a portion of the light bulb and light bulb socket from FIG. 1.

FIG. 9 shows an example of how the contactless electrical power transmitter 50 and the contactless electrical power receiver 30 may be aligned when the light bulb 12 is in the installed configuration in FIG. 1. The two components may be physically separated from one another by at least the end plate 25b of the base 24 of the light bulb 12 and the closed end surface 47b of the recess 46 in the housing 40 of the light bulb socket 14. Thicknesses of the end plate 25b and the closed end surface 47b may be designed to put the contactless electrical power transmitter 50 and the contactless electrical power receiver 30 at an optimum distance from one another for maximizing contactless electrical power transfer. In the example shown in FIG. 9, when the light bulb 12 is installed in the light bulb socket 14, the contactless electrical power transmitter 50 and the contactless electrical power receiver 30 are separated by a distance of about 3 mm. However, other distances may be used as well, depending on the size and other characteristics of the contactless electrical power transmitter 50 and the contactless electrical power receiver 30, space requirements, power requirements, and the like.

To operate the light bulb 12, the light bulb socket 14, and more particularly the contactless electrical power transmitter 50, may generate magnetic fields to induce current in the contactless electrical power receiver 30 of the light bulb 12. It may be desirable to prevent the light bulb socket 14 from generating such magnetic fields when the light bulb 12 is not installed in the light bulb socket 14. In some instances, the lamp assembly 10 may include a dedicated power switch (not shown) for turning the lamp assembly 10 on and off, as is conventionally known. However, it may further be desirable to prevent magnetic field generation when the power switch is accidentally in the "on" position while a light bulb 12 is absent or improperly installed.

In the example shown in the drawings, the light bulb socket 14 may be provided with a reed switch 66 that is configured to prevent power from flowing to the contactless electrical power transmitter 50 from the light power supply 52 until the light bulb 12 is correctly installed. As can be seen in FIGS. 6 and 8, the reed switch 66 may be mounted to a ring-shaped circuit board 68 or other component that electrically connects with the contactless electrical power transmitter 50. In FIG. 4, the base 24 of the light bulb 12 may include an activation magnet 70 embedded or otherwise retained therein. As explained earlier, the light bulb 12 may be inserted into the light bulb socket 14 and rotated until the mating ribs 26 reach the end of the mating slots 48. At that point, the activation magnet 70 may come into alignment with the reed switch 66. The activation magnet 70 may activate the reed switch 66 by changing its state from normally open to closed, allowing electrical power to flow to the contactless electrical power transmitter 50. Although the depicted example uses rotation of the light bulb 12 in the light bulb socket 14 to align the activation magnet 70 with the reed switch 66, other configurations and orientations may be used as well, including placement of the reed switch 66 and activation magnet 70 in respective sidewalls 47a, 25b of the recess 46 and base 24. Moreover, other methods for deactivating the contactless electrical power transmitter 50 in the absence of the light bulb 12 may be used as well, including the use of mechanical, optical, or other types of sensors, physical switch activation, combinations thereof, or the like.

The concepts described herein may be used with many different types of light bulbs, including standard types (e.g., similar to light bulb 12 shown in the drawings), tubular, floodlight, candle, globe, and the like, and the light bulb socket may be implemented in many different types of fixtures, such as overhead, recessed, wall-mounted, suspended, track, adjustable, enclosures, ceiling fans, and the like. Similarly, the concepts described herein may be used with different types of bulb wattages, temperatures, and other characteristics.

Although shown and described in such a way that the base 24 of the light bulb 12 is received in a recess 46 of the light bulb socket 14, it is conceivable that the invention may also be implemented through a reverse configuration, wherein the light bulb base forms a recess and fits over and attaches to a mating protrusion of the light bulb socket while utilizing contactless electrical power transmitters and receivers in a similar manner. It may also be possible to include more than one contactless electrical power transmitter or receiver in a lamp assembly. Moreover, while a lamp assembly 10 has been described herein as including the light bulb 12 and the corresponding light bulb socket 14, the lamp assembly 10 may include other components not shown or described herein, such as, but not limited to, a neck, base, finial, frame, harp, collar, baffle, reflector, trim, and the like.

While specific and distinct embodiments have been shown in the drawings, various individual elements or combinations of elements from the different embodiments may be combined with one another while in keeping with the spirit and scope of the invention. Thus, an individual feature described herein only with respect to one embodiment should not be construed as being incompatible with other embodiments described herein or otherwise encompassed by the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A light bulb comprising:
    one or more LEDs;
    a housing containing the one or more LEDs, at least a portion of the housing being at least partially transparent to one or more wavelengths of light emitted by the one or more LEDs;
    a driver disposed within the housing and electrically connected to the one or more LEDs for driving the one or more LEDs;
    a non-metallic base formed at an end of the housing;
    a contactless electrical power receiver disposed within the non-metallic base and electrically connected to the driver, the contactless electrical power receiver being configured to contactlessly receive electrical power from an external power source and provide the received electrical power to the driver; and
    an activation magnet embedded or retained within the non-metallic base, the housing having a longitudinal axis, the activation magnet being spaced apart from the longitudinal axis.

2. The light bulb of claim 1, wherein the non-metallic base includes an end plate and a cylindrical sidewall extending therefrom, the contactless electrical power receiver being disposed adjacent to the end plate.

3. The light bulb of claim 2, further comprising at least one magnet disposed in the cylindrical sidewall.

4. The light bulb of claim 2, wherein the non-metallic base includes one or more mating ribs protruding from the cylindrical sidewall, wherein one or more magnets are partially disposed within the one or more mating ribs.

5. The light bulb of claim 1, wherein the driver includes a rectifier and a power converter.

6. The light bulb of claim 1, wherein the contactless electrical power receiver is a receiving inductor coil.

* * * * *